United States Patent
Colman

(10) Patent No.: US 6,753,758 B2
(45) Date of Patent: Jun. 22, 2004

(54) SYSTEM AND METHOD FOR SWITCHING VOLTAGE

(76) Inventor: Gerald Adolph Colman, 8460 Harrison Pkwy., Fishers, IN (US) 46038

(*) Notice: Subject to any disclaimer, the term of this patent is extended or adjusted under 35 U.S.C. 154(b) by 556 days.

(21) Appl. No.: 09/753,832

(22) Filed: Jan. 3, 2001

(65) Prior Publication Data
US 2002/0124193 A1 Sep. 5, 2002

(51) Int. Cl.[7] .............................................. G06K 19/06
(52) U.S. Cl. ....................... 340/5.6; 340/5.65; 235/492; 725/6
(58) Field of Search ................................. 340/5.6, 5.65; 235/375, 380, 382, 382.5, 492; 713/300, 200; 710/301, 14; 365/226, 52; 702/64; 725/6

(56) References Cited

U.S. PATENT DOCUMENTS

| | | | |
|---|---|---|---|
| 4,767,920 A | 8/1988 | Kitta et al. | ................. 235/492 |
| 5,265,161 A | 11/1993 | Rodriguez | ................. 380/23 |
| 5,450,365 A | * 9/1995 | Adachi | ................. 365/226 |
| 5,708,799 A | * 1/1998 | Gafken et al. | ................. 710/301 |
| 6,137,710 A | 10/2000 | Iwasaki et al. | ................. 365/52 |
| 6,148,347 A | * 11/2000 | Finch et al. | ................. 710/14 |
| 6,168,077 B1 | * 1/2001 | Gray et al. | ................. 235/375 |
| 6,470,284 B1 | * 10/2002 | Oh et al. | ................. 702/64 |

FOREIGN PATENT DOCUMENTS

| EP | 1 037 159 | 9/2000 | ............ G06K/7/00 |
|---|---|---|---|

* cited by examiner

Primary Examiner—Edwin C. Holloway III
(74) Attorney, Agent, or Firm—Joseph S. Tripoli; Paul P. Kiel

(57) ABSTRACT

A device and method for providing varying bias voltages to a security device in a cable set-top terminal, comprising a receiving unit in the security device for receiving replaceable conditional access cards, a card interface for sensing the insertion of conditional access cards in the receiving unit and outputting an enable signal to a logic unit, and the card interface for identifying a bias voltage of the conditional access card and outputting a request of the bias voltage to a controller, a controller for receiving the request of bias voltage from the card interface and outputting a selection signal of the bias voltage to a logic unit, the logic unit for receiving the enable signal from the card interface and selection signal of the bias voltage from the controller to output a control signal to a switch, and a switch for receiving a control signal from the logic unit and providing a switched voltage to the security device based on the selection signal from the controller.

4 Claims, 1 Drawing Sheet

SYSTEM AND METHOD FOR SWITCHING VOLTAGE

BACKGROUND OF THE INVENTION

1. Field of the Invention

The present invention relates to a device and a method for power supply switching, more particularly, to a device and method of switching voltages applied to security devices.

2. Discussion of Related Art

Viewers of cable television systems typically access cable content via a set-top box. The set-top boxes are usually equipped with conditional access and security circuitry for selective access to premium services such as pay-per-view.

The conditional access and security circuitry may be encapsulated in a replaceable security device such as a point of deployment (POD) module, smart card, etc. In this way, the security system can be upgraded or replaced over time without impacting the set-top box of a cable system.

While the security device is replaceable and different conditional access cards can be plugged into each individual module, different modules and cards require different bias voltages.

Further, when certain security device and conditional access cards are selected, different modes of a module require different voltage supplies. For example, except in standby mode, the Vcc pins of the security device should be supplied with 3.3V, while different voltages are needed for other modes of operation.

A need therefore exists for a device which can supply different voltages to a security device. There is a further need for a switching power supply device capable of sensing the change of voltage requirement when a security device is replaced or a different conditional access card is used for operation in different modes.

SUMMARY OF THE INVENTION

A device is provided for varying bias voltages to a security device in a cable set-top box, comprising a receiving unit in the security device for receiving replaceable conditional access cards, a card interface for sensing the insertion of conditional access cards in the receiving unit and outputting an enable signal to a logic unit, and the card interface for identifying a bias voltage of the conditional access card and outputting a request of the bias voltage to a controller, a controller for receiving the request of bias voltage from the card interface and outputting a selection signal of the bias voltage to a logic unit, the logic unit for receiving the enable signal from the card interface and selection signal of the bias voltage from the controller to output a control signal to a switch, and a switch for receiving a control signal from the logic unit and providing a switched voltage to the security device based on the selection signal from the controller.

A method for providing Vcc voltages to a security device in a cable set-top box, comprising the steps of receiving a replaceable conditional access card in the security device, sensing a replacement of the conditional access card in the security device, identifying varying bias voltages of the conditional access card in the security device, providing an enable signal from a card interface, providing a selection signal of the bias voltage from a controller, combining the enable and selection signals in a logic unit, providing a control signal to a switch, and providing a switched voltage to a receiving unit in the security device based on the selection signal from the controller.

DESCRIPTION OF PREFERRED EMBODIMENTS

Figure 1:
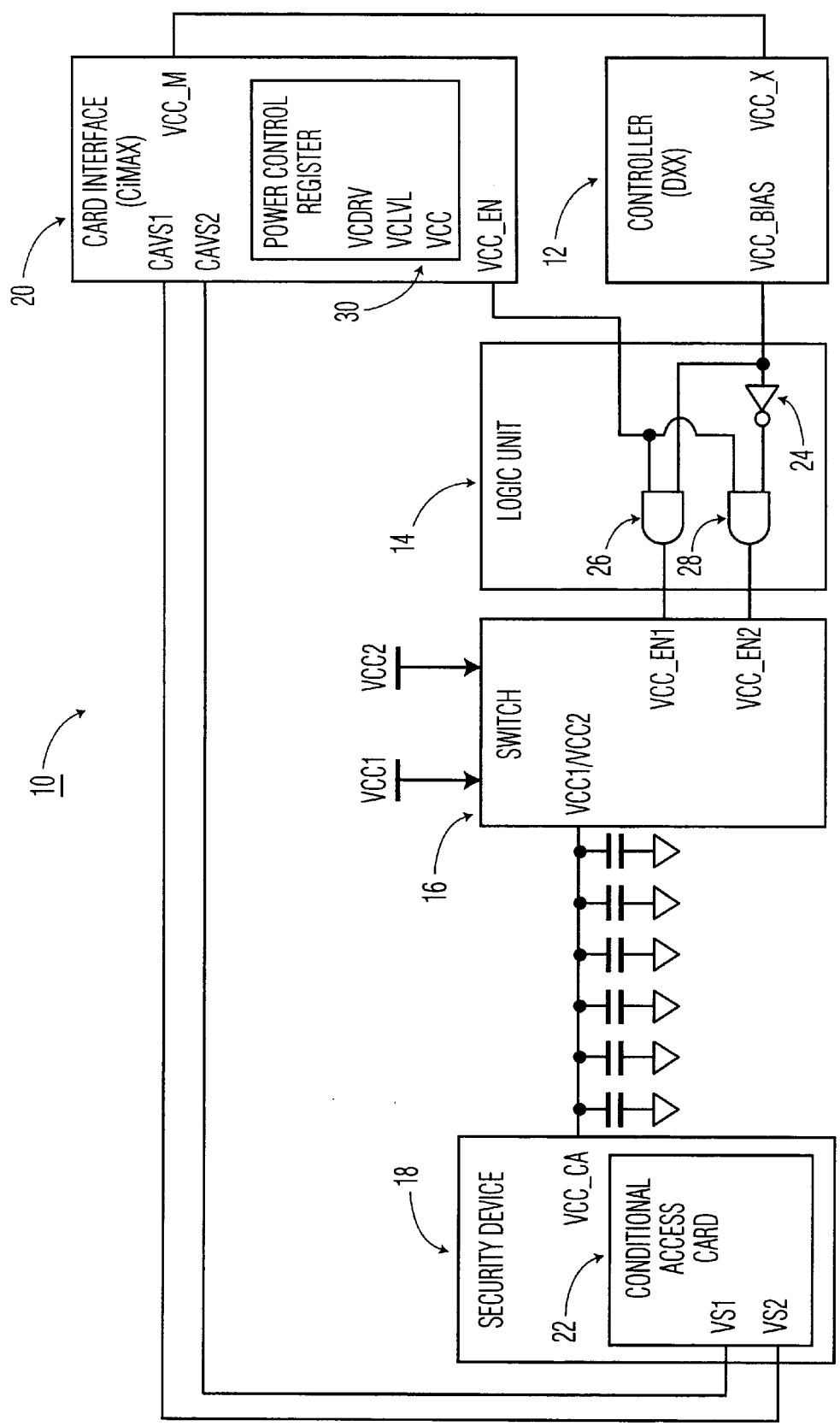
FIG. 1 is a block diagram of an embodiment of a switching voltage device according to the present invention.

Referring to FIG. 1, a security device 18 is a replaceable device used in a cable system to provide, for example, a security function for conditional access, and a signaling function for descrambling transport-streams. For the security function, the security device 18 provides a standard interface to allow a separation of conditional access functions from those of set-top box functions. The security device 18 includes a conditional access card 22 to support the security function for conditional access. By replacement of different conditional access cards 22, the security device 18 can be upgraded over time with minimal impact to the set-top. Different conditional access cards 22 can be inserted into the security device 18 to gain access to different programs such as pay-per-view.

A card interface 20 connects to the conditional access card 22 in the security device 18 for sensing the insertion of a card 22 and identifying a bias voltage request of the conditional access card 22. The insertion and voltage request signals of conditional access card 22 are outputted from voltage sense pins VS1 and VS2 and sensed by conditional access voltage sense pins CAVS1 and CAVS2 in the card interface 20. The card interface 20 then forwards the operation mode (power-on) voltage request, e.g., 5V and 3.3 V, through pin VCC_M to pin VCC_X in a controller 12.

The conditional access card 22 provides a combination of HIGH and/or LOW level signals through voltage sense pins VS1 and VS2 shown in Table 1 to signal its voltage requirement.

TABLE 1

| VS1 | VS2 | Voltage Required |
|------|------|------------------|
| High | High | 5 V |
| Low | High | 3.3 V |
| High | Low | 0 V |
| Low | Low | 3.3 V |

The controller 12 controls the operation mode voltage supply to the security device 18. Based on the signal received from pin VCC_X, the controller 12 directs requested operation mode voltages, e.g., 5V or 3.3V, to be applied to the security device 18 by configuring a signal VCC_BIAS for selection of requested bias voltages to the logic unit 14.

If the requested voltage for security device 18 is 5V, the controller 12 outputs a HIGH level VCC_BIAS signal. If the requested voltage for security device 18 is 3.3V, the controller 12 outputs a LOW level VCC_BIAS signal. The controller 12 is preferably a STi5505 DXX, a multipurpose digital video decoder and display processor integrated circuit, commercially available from SGS-Thomson Microelectronics.

The card interface 20 controls the power-on and power-off modes of the security device 18 by enabling bias voltages to be supplied to the security device 18 with signal VCC_EN. The signal VCC_EN outputted from the card interface 20 enables the logic unit 14 when the security device 18 requests bias voltages for operation. The signal VCC_EN outputted from the controller 20 disables or power-off the security device 18 via the logic unit 14 and switch 16 when the card 22 is being inserted or removed.

A power control register 30 is provided in the card interface 20 to implement the power on/off mode. When the insertion signal from the conditional access card 22 is sensed by the card interface 20, the power control register 30 identifies the insertion and sets up the power on/off mode accordingly. The register 30 sets VCC=0 as power OFF when the insertion signal indicates that the conditional access card 22 is being inserted or removed. The register 30 sets VCC=1 as power ON when the insertion signal indicates that the conditional access card 22 is not being inserted or removed.

The power control register 30 is also being capable of driving different types of switches 16 by selecting the switch structure (open-drain or push-pull) and switch active level (high or low) of the switch 16. The specification of the switch structure and switch active level can be determined and identified before being installed to the present invention. After the installation, the power control register 30 conducts the set up of the switch structure by changing the bit VCDRV ("module Vcc output pin structure"), and the switch active level by changing the bit VCLVL ("module Vcc output pin active level") in complying with the specification of the switch 16. For example, the register 30 can set a VCDRV=0 as a switch being open drain, or a VCDRV=1 as a switch being push-pull. The register 30 can set a VCLVL=0 as a switch being active-low, or a VCLVL=1 as a switch being active-high. In this preferred embodiment, the register 30 is programmed to have a push-pull and an active-high, or VCDRV=1 and VCLVL=1.

By having the power control register 32 to set up bits of VCDRV, VCLVL, and VCC, the card interface 20 complies with the configuration of the switch 16 and determines the power on/off mode for the security device 18. Based on these set up, the card interface 20 outputs an enable VCC_EN signal to the switch 16 via the logic unit 14. Preferably, the card interface 20 is a CIMAX, sold as part of Common Interface integration package (CI Pack+) by SCM Microsystem.

The enable VCC_EN signal from the card interface 20 is logically combined with the VCC_BIAS signal from the controller 12 by the logic unit 14 to output control signals to the switch 16. Note that the combination of both VCC_EN and VCC_BIAS signals is a quasi-DC current event, so timing of sending signals from the card interface 20 and controller 12 being simultaneously is noncritical.

According to a preferred embodiment of the present invention, the logic unit 14 contains an inverter 24, an AND gate 26, and an AND gate 28. With VCC_EN at HIGH and VCC_BIAS of the controller 12 is HIGH, the upper AND gate 26 has a HIGH output applied to VCC_EN1 of switch 16. Switch 16 is connected with 5V at VCC1 and 3.3V at VCC2. A HIGH signal at VCC_EN1 will output 5V at VCC1/VCC2 to VCC_CA of security device 18. The lower AND gate 28 is disabled to a LOW logic by the HIGH signal of VCC_BIAS through the inverter 24. When the output signal VCC_BIAS of the controller 12 is LOW and VCC_EN is HIGH, the lower AND gate 28 outputs a HIGH. The pin VCC_EN2 of the switch 16 receives a HIGH signal and 3.3V is applied to VCC_CA of the security device 18. The upper AND gate 26 is disabled to a LOW logic by the LOW signal of VCC_BIAS.

Advantageously, the switch 16 ensures that the 3.3V and 5V switches are never turned on at the same time by locking out the 3.3V switch when the 5V switch is turned on, and locking out the 5V switch when the 3.3V switch is turned on (as shown in Table 2). Preferably, switch 16 is a LTC1472, commercially available from Linear Technology.

TABLE 2

| Vcc_EN1 | Vcc_EN2 | VCC1/VCC2 |
|---------|---------|-----------|
| 0 | 0 | OFF |
| 1 | 0 | 5 V |
| 0 | 1 | 3.3 V |
| 1 | 1 | OFF |

In this preferred embodiment, capacitors between the switch 16 and the security device 18 are used to filter high-frequency noise and provide charge during instantaneous current-draws from the security device 18.

As described above, the power supply switching device according to the present invention can supply different voltages to a security device. That is, the device of the present invention is capable of sensing the change of bias voltage when a security device is replaced or a different Conditional Access card is used for operation in different modes, and supply the requested voltages accordingly.

It can be appreciated that the specific embodiment described is merely illustrative of the general principles of the invention. Various modifications may be provided consistent with the principles set forth.

What is claimed is:

1. A device for providing varying bias voltages to a security device, comprising:
    a receiving unit for receiving replaceable conditional access cards;
    a card interface for sensing the insertion of conditional access cards in the security device, the card interface responsive to first and second voltage signals output from a conditional access card for outputting an enable logic signal to a logic unit representing one of a bias voltage ON condition and a bias voltage OFF condition, and for identifying a bias voltage of the conditional access card and outputting a request of the bias voltage to a controller;
    a controller far receiving the request of bias voltage from the card interface and outputting a selection signal of the bias voltage to the logic unit; and
    a switch for receiving a control signal from the logic unit based on the selection signal from the controller and the enable logic signal from the card interface and providing a switched voltage to the security device.

2. The device as in claim 1, wherein the bias voltage is preferably one of 3.3, 5 and 0 Volts.

3. A method of providing bias voltages to a security device associated with a video processing apparatus, comprising the steps of:
    receiving first and second voltage signals at a card interface and determining the presence of a conditional access card in a security device based on the logic level of at least one of said first and second voltage signals;
    determining a bias voltage value at said card interface based on the logic levels of both of said first and second voltage signals;
    providing an enable logic signal from said card interface representing one of a bias voltage ON condition and a bias voltage OFF condition;
    providing a selection signal indicative of the bias voltage; combining the enable logic and selection signals in a logic unit to generate a control signal; and
    providing a switched voltage to a security device based on the control signal.

4. The method as in claim 3, wherein the providing a selection signal indicative of the bias voltage comprises the steps of providing one of 3.3V and 5V for a power-on mode operation.

* * * * *